June 6, 1972  H. EGGERT  3,667,772

SINGLE-TRACK SLED VEHICLE

Filed March 25, 1970  2 Sheets-Sheet 1

HEINZ EGGERT

United States Patent Office 3,667,772
Patented June 6, 1972

3,667,772
SINGLE-TRACK SLED VEHICLE
Heinz Eggert, Moosstrasse 11, Salzburg, Austria
Filed Mar. 25, 1970, Ser. No. 22,512
Claims priority, application Austria, Mar. 26, 1969,
A 2,971/69
Int. Cl. B62b *13/04*
U.S. Cl. 280—16      1 Claim

ABSTRACT OF THE DISCLOSURE

The invention relates to a single-track sled vehicle with a steerable front skid and a framelike rear skid connected to it by a joint and carrying the rider's seat wherein each of the two skids is an integral springing member, preferably elastic synthetic plastic material, these skids being made rigid only in the region of the joint which connects them.

BACKGROUND OF THE INVENTION

In the case of known constructions of a single track sled-vehicle, front and rear skids are rigidly constructed. This has been found to be disadvantageous because irregularities in the terrain and particularly at relatively high speeds impart considerable jolts to the rider which, have often been found to injure the spine. Also the steerability of the sled vehicle is adversely affected since, by reason of its rigidity, it tends to jump when negotiating uneven terrain; once off the ground steering errors easily occur causing a fall when the vehicle again contacts the ground. However, even if the vehicle does not leave the ground, the rigidity of the skids proves disadvantageous since the shocks acting on the vehicle result in failure of the steering, so that unskilled riders lose control and fall.

SUMMARY OF THE INVENTION

According to the invention, the aforesaid disadvantages of an aforementioned sled vehicle are avoided because each of the two skids is an integral resilient member, preferably of elastic synthetic plastic material, and each is made rigid only in the region of the joint at which they are connected. Thus, while the sled vehicle is easy to manufacture, the jolts caused by unevenness of the ground are largely absorbed thereby improving riding and reducing the risk of injury. The feature that the two skids are rigid only by the joint and only in the region of their mutual connection, effectively prevents the two skids twisting in respect of each other, so that track maintenance is facilitated. If synthetic plastic material is used for the skids, the adaptability of the mechanical properties of synthetic plastics, makes it easy to adapt the device to the person and especially the weight of the rider.

The rigid joint which connects the two skids preferably comprises two comblike interengaging parts, one secured to the front skid, the other to the framelike rear skid, both joint parts having bores which, in the engaged state, are aligned co-axially, to receive a hinge pin connecting the two joint parts. Such a construction, while offering high rigidity and safety in the joint, permits easy assembly and separation and consequently an easy connection or detachment of the two skids. The base plates of the comblike joint parts stabilize the skids in the region of their reciprocal connection. The hinge pin is formed by the steering rod which serves to steer the front skid and is non-rotatably connected to the front skid via the comblike joint part which is mounted on the front skid. When the sled vehicle is dismantled, only three component parts result, namely, the front skid, rear skid and steering rod; there is no separate hinge pin which may be lost, when the vehicle is being assembled outdoors and in deep snow.

BRIEF DESCRIPTION OF THE DRAWINGS

An exemplary embodiment of the invention is ilulstrated in the attached drawings, in which.

DETAILED DESCRIPTION OF THE INVENTION

Figure 1:
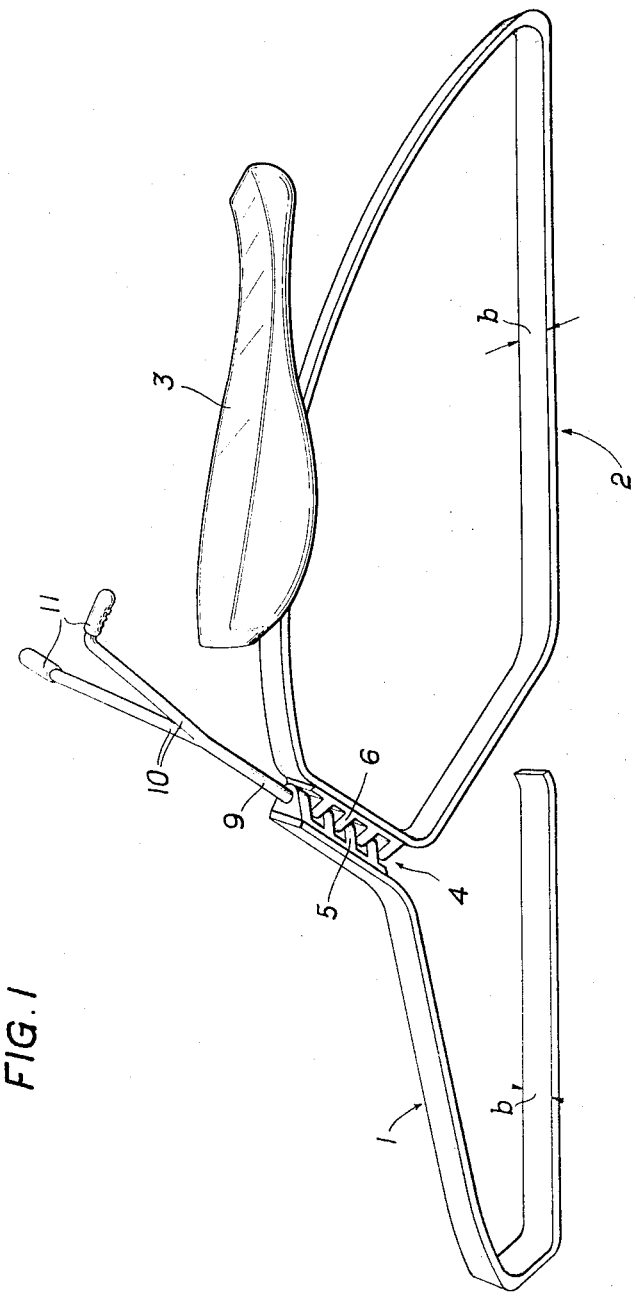
FIG. 1 is the perspective view of single-track sled vehicle.
Figure 2:
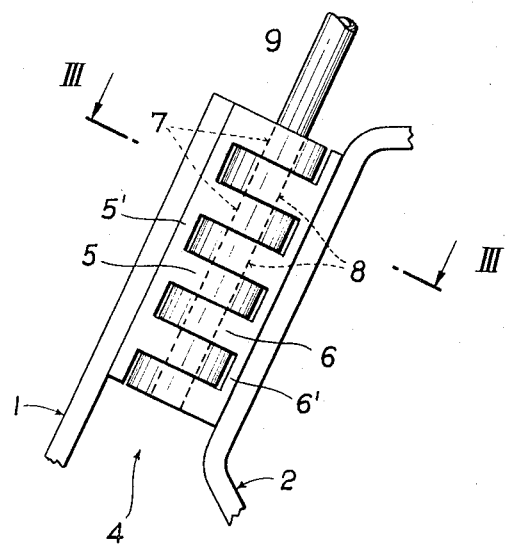
FIG. 2 is a side view of the joint connecting the two skids, on an enlarged scale.
Figure 3:
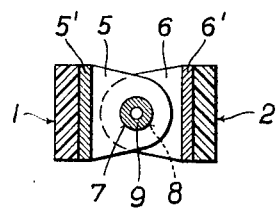
FIG. 3 is a section taken along the line III—III in FIG. 2.

Referring to the drawings a steerable front skid 1 is pivotally connected to a framelike rear skid 2, carrying rider's seat 3, through a joint 4. Each of the two skids is made in one piece from resilient material, preferably elastic synthetic plastic material; preferably, the synthetic plastic material is glass-fibre reinforced epoxy resin. The skids 1 and 2 take the form of a correspondingly bent strip with approximately the same width *b* and are made rigid only in the region of the joint 4 which connects them. The joint 4 consists thereby of two interengaged comblike rigid parts 5, 6, of which the part 5 is mounted on the front skid 1 by its base plate 5′ and the part 6 is mounted on the rear skid by its base plate 6′. The base plates 5′ and 6′ thus reinforce the front skid 1 and rear skid 2 respectively in the region of the joint. The joint part 5 has bores 7 and the joint part 6 has bores 8, the bores of both joint parts being aligned coaxially in the interengaged state. The bores 7, 8 receive a hinge pin 9 which pivotally connects the two comblike joint parts 5, 6. The hinge pin 9 is formed by the bottom part of the steering rod 10 which serves to steer the front skid and which extends forklike at the top to form the two handlebars 11. The hinge pin 9 and thus the steering rod 10 is non-rotatably connected to the front skid 1 via the comblike joint part 5 in a conventional manner.

When the single-track sled vehicle is dismantled, the steering rod 10 and with it the hinge pin 9 is withdrawn from the bores 7, 8 of the joint parts 5, 6. The front skid 1 and the rear skid 2 can then be separated from each other merely by pulling apart the two comblike joint parts 5, 6. The front skid 1 can then be inserted into the framelike rear skid 2 so that only a small space is required to transport the dismantled vehicle, a factor particularly favourable if the device is to be carried in the luggage boot of a motor car. When the components of the sled vehicle are assembled, the comblike joint parts 5, 6 are so interengaged that the bores 7, 8 of these parts align co-axially, whereupon it is only necessary for the hinge pin 9 formed by the bottom part of the steering rod 10 to be inserted into the bores 7, 8 for vehicle to be ready for use.

What I claim is:

1. A single-track sled vehicle comprising a steerable resiliently flexible front skid having generally the form of a bent strip including a first rigid comb-like part secured thereto, a frame-like resiliently flexible rear skid including a bent strip frame and a rider's seat and a second rigid comb-like part secured thereto, the vehicle including a joint which directly interconnects the front and rear skids at said first and second comb-like parts, the joint including a single removable pin pivotably connected to said second comb-like part, and secured non-rotationally fast to said first comb-like part, the pin having an extension which forms a handle-bar for steering the front skid, whereby the single-track sled vehicle can be disassembled into only three parts, namely, the front skid, the rear skid and the single removable pin.

References Cited
UNITED STATES PATENTS

| | | | |
|---|---|---|---|
| 3,425,707 | 2/1969 | Horiuchi et al. | 280—16 |
| 2,637,565 | 5/1953 | Lantry | 280—16 |
| 201,519 | 3/1878 | Graether | 280—25 |
| 1,462,889 | 7/1923 | Slater | 280—16 |

FOREIGN PATENTS

| | | | |
|---|---|---|---|
| 91,597 | 11/1921 | Switzerland | 280—16 |
| 454,635 | 6/1968 | Switzerland | 280—16 |

BENJAMIN HERSH, Primary Examiner

W. H. DOUGLAS, Assistant Examiner

U.S. Cl. X.R.

280—22, 25